INVENTOR
WILLIAM B. WEBER

United States Patent Office 3,522,648
Patented Aug. 4, 1970

3,522,648
SEALED HOLE AND METHOD OF PRODUCING
William B. Weber, Hayward, Calif., assignor to Caterpillar Tractor Co., Peoria, Ill., a corporation of California
Filed Nov. 29, 1968, Ser. No. 779,742
Int. Cl. B21d 39/00; B23p 11/02
U.S. Cl. 29—522
1 Claim

ABSTRACT OF THE DISCLOSURE

A sealed hole which has been formed in a part of a mechanical device as a necessary implement to construction, and must be tightly closed when the device is in operation, which is formed by the method of placing a slug or ball of ductile metal in the hole and upsetting or deforming the ball to create a close metal-to-metal bond between the metal of the ball and the sidewall of the hole.

Often in the manufacture of parts for assembly into a mechanical device, it is necessary to provide holes which must later be sealed. For example, locating pins in one part often extend into another part to insure precise positioning in assembly. Often the holes for these pins are drilled all of the way through one part and into the other part so that pins fitted in the one part will project into the hole in the other part for precise positioning. Though the pins are pressed into place, the fit is not such as to withstand fluid pressures of great magnitude and it is necessary to provide a seal in the hole behind the pin. One method of doing this has been by the use of an epoxy resin, but this has been unsatisfactory because the resin is often dissolved by solvents required in cleaning of the assembled parts. Other holes are sometimes drilled through castings to provide internal connecting fluid passages. It is convenient and expedient in some cases, to drill the hole from the exterior of the casting but the external portion of the hole must later be sealed.

The present invention accomplishes this sealing of the holes by placing a slug of metal preferably of spherical shape into the hole. The slug or sphere is preferably a snug fit in the hole and it is backed by an anvil and then struck or pressed with an upsetting or deforming tool so that the metal of the slug flows into a more or less cylindrical shape and into extremely close contact with the inner cylindrical wall of the hole.

A better understanding of the invention and the manner in which it is carried into practice will be gained from the following specification wherein reference is made to the accompanying drawing:

Figure 1:
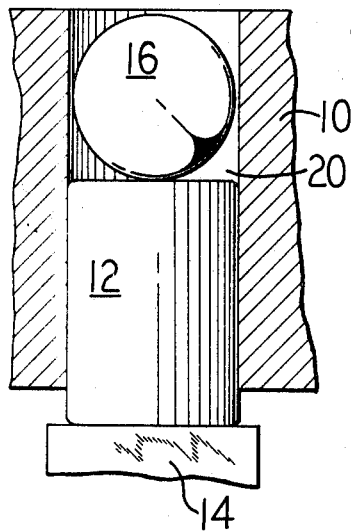
FIG. 1 is a central sectional view through a hole formed through a piece of metal and showing a pin therein and an anvil backing the pin and a ball resting on the pin.
Figure 2:
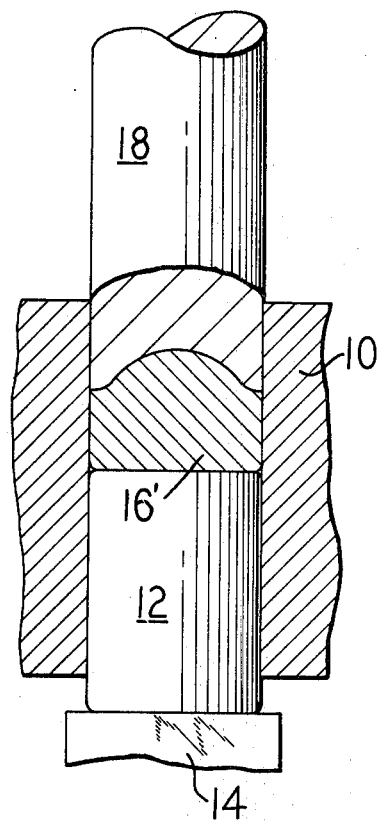
FIG. 2 is a view like FIG. 1 showing a punch in place within the hole and the ball deformed thereby.

In FIG. 1 a piece of metal shown at 10 represents the wall of a casting or the like in which it is necessary to form a hole which must thereafter be sealed. A dowel pin 12 is disposed within the hole and is shown as backed by an anvil 14. In this case, the dowel is a locating pin which remains in the hole permanently. However in the event the hole is to serve a different purpose, an anvil in the shape of the dowel pin will be inserted into the hole. Alternately a flat anvil may be placed over the end of the hole and held firmly against casting 10. A ball 16 of metal preferably more ductile than the casting and dowel pin is inserted in the hole and then deformed or upset by a punch, shown at 18 in FIG. 2, which may be forced against the ball by any suitable means such as a hand hammer, a power hammer or a suitable press. When sufficient force has been applied, the ball assumes the shape shown in FIG. 2 where it is represented by the reference character 16'. Preferably, the end of the punch in contact with the ball is concave to substantially conform to the ball. This has the advantage that the upsetting of the metal causes it to flow downwardly, rather than upwardly toward the punch, and directly into the annular space of generally triangular cross section shown at 20 in FIG. 1.

Figure 3:
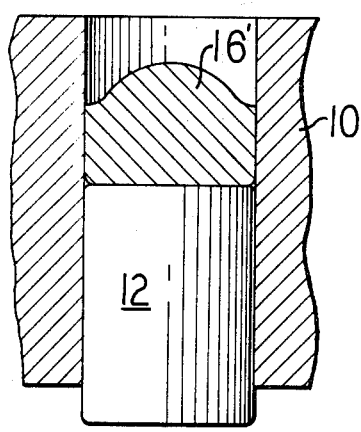
FIG. 3 is a similar view with the punch removed and a plug formed by the method described remaining as a sealing device in the hole.

The sudden downward flow of metal is abruptly interrupted when this space is filled, and it is forcibly pressed outwardly into contact with the walls of the cylindrical hole. While it is not entirely essential that a spherical plug be used, it has been found preferable to plugs of other configurations. After suitable pressure has been applied, the punch 18 is removed and the sealed hole appears as illustrated in FIG. 3 where it will be seen that the pin 12 remains to serve its aligning or locating function.

While, as before stated, the pin 12 may be a press fit, it has been found that it does not provide a good seal against high pressures such, for example, as are to be found on the fuel pumps of compression ignition engines. While an extremely good seal is formed, the plug may be pressed out of the hole if necessary for repairs or the like and even though the hole might be slightly scratched or distorted in this operation, a new plug, when inserted, will conform completely to any irregularities in the surface of the hole that have been formed and again form a perfect seal.

While many metals may be used, the plug should be of relatively soft metal as compared to the material in which the hole is formed and should be sufficiently ductile to flow into the desired form without undue pressure. Tests have shown, for example, that a sphere of annealed aluminum having a hardness of Rockwell F–55 to 60 proves entirely satisfactory for sealing a hole in metal such as cast iron or steel.

What is claimed is:

1. The method of sealing a cylindrical hole extending through an artcile which comprises placing a spherical slug in the hole, the slug being formed from a material which is more ductile than that in which the hole is formed, arranging a dowel within the hole to provide an anvil for aligning and initially supporting the slug, applying axial force upon the slug by means of a tool fitting within the hole, the tool being selected to have a concave end conforming to the configuration of the slug, the axial force being sufficient to compress the slug in a direction generally axially of the hole and to cause the slug to expand radially outwardly into intimate contact with the wall of the hole.

References Cited

UNITED STATES PATENTS

| 1,773,855 | 8/1930 | Peters | 29—522 |
| 1,798,890 | 3/1931 | Mayo et al. | |
| 1,801,006 | 4/1931 | Jacoby | 220—24.5 X |
| 2,219,573 | 10/1940 | Fraenckel | 220—82 X |
| 2,700,087 | 1/1955 | Stevens. | |

JOSEPH R. LECLAIR, Primary Examiner
J. R. GARRETT, Assistant Examiner

U.S. Cl. X.R.
220—24.5